(12) United States Patent
Fest

(10) Patent No.: US 7,477,080 B1
(45) Date of Patent: Jan. 13, 2009

(54) CURRENT LOOP POWERED ISOLATOR AND METHOD

(76) Inventor: Otto Fest, 6807 E. Camino del Dorado, Tucson, AZ (US) 85715

( * ) Notice: Subject to any disclaimer, the term of this patent is extended or adjusted under 35 U.S.C. 154(b) by 42 days.

(21) Appl. No.: 11/506,615

(22) Filed: Aug. 17, 2006

Related U.S. Application Data

(60) Provisional application No. 60/709,754, filed on Aug. 22, 2005.

(51) Int. Cl.
   *H02M 11/00* (2006.01)
(52) U.S. Cl. ............................... 327/102; 327/100
(58) Field of Classification Search ......... 327/100–103; 323/313
   See application file for complete search history.

(56) References Cited

U.S. PATENT DOCUMENTS

| 5,307,006 | A | * | 4/1994 | Rankin et al. ............... 323/313 |
| 6,285,094 | B1 | | 9/2001 | Fest |
| 6,370,408 | B1 | * | 4/2002 | Merchant et al. ............ 600/322 |
| 7,162,653 | B2 | * | 1/2007 | Mares et al. ................ 713/310 |

* cited by examiner

*Primary Examiner*—Dinh T. Le
(74) *Attorney, Agent, or Firm*—Mark Ogram

(57) ABSTRACT

A system and method for isolating the input and output of a self-powered current loop includes coupling a voltage to frequency converter to the input terminals and connecting the output of the voltage to frequency converter through an optical isolator, either directly or through other circuitry, to the output terminals depending upon the nature of signals which are to be provided from the circuit.

5 Claims, 1 Drawing Sheet

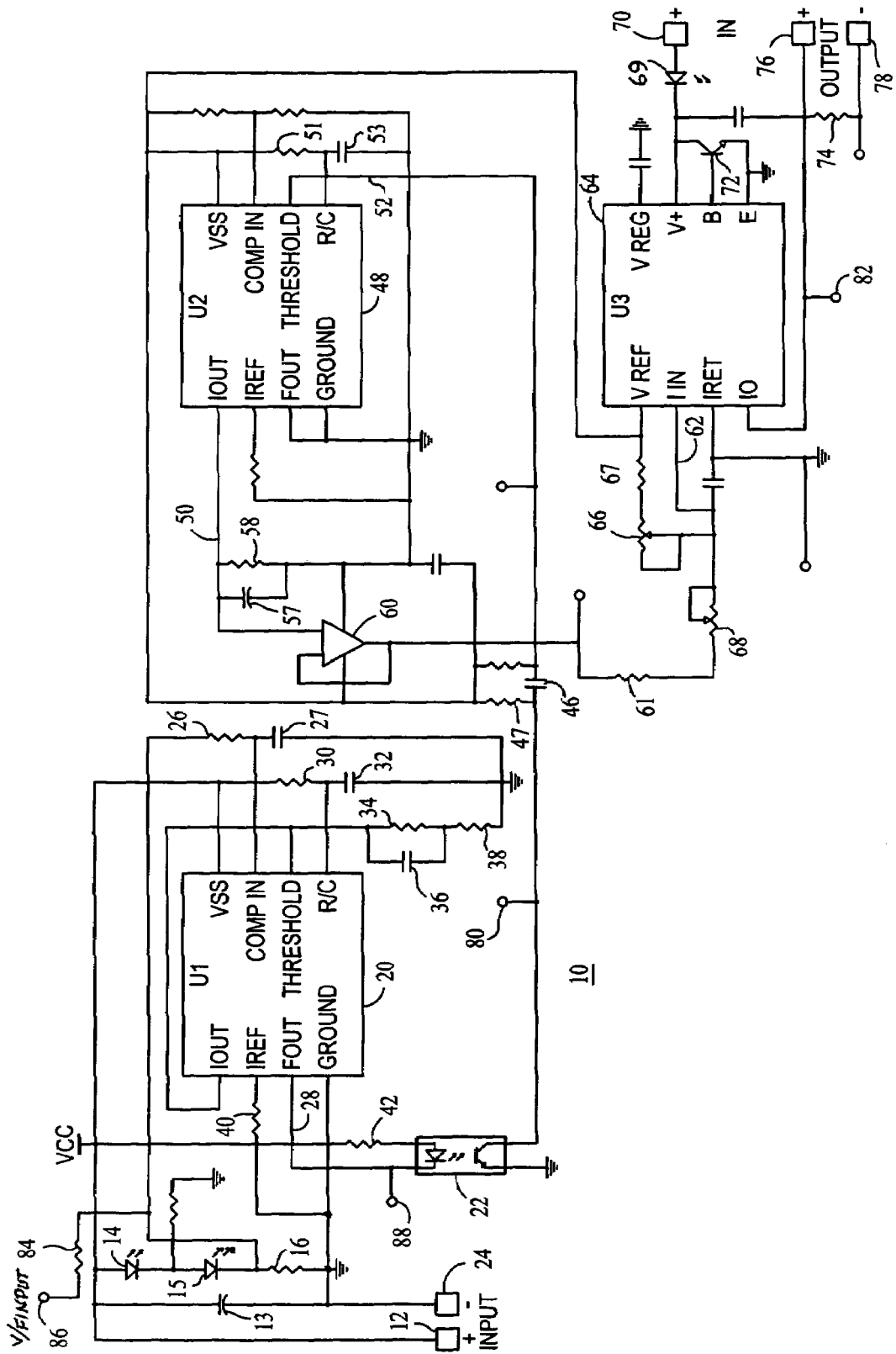

CURRENT LOOP POWERED ISOLATOR AND METHOD

RELATED APPLICATION/PRIORITY DOCUMENT

This patent application corresponds to, and claims the benefit of priority under Title 35 U.S.C. §119(e) of co-pending provisional application Ser. No. 60/709,754 filed Aug. 22, 2005, incorporated herein by reference.

BACKGROUND

This invention relates to electric control and monitoring circuits, and more specifically, to circuits using self-powered current loops to transmit process variables to remote locations. For many applications, due to safety regulations, the connections to the loop must be earth grounded, creating a ground loop and/or defeating the "hazardous to safe area" requiring isolation.

Products have been provided which provide "galvanic" (transformer) isolation which, due to its inherent design, provides a limited isolation to typically 500 VDC/RMS. Due to the transformer oscillator driven design, such isolation products inject a "chopper" noise on the source, creating problems for other electronic components in the loop, as well as being subject to extreme temperatures and humidity. This limits the use of such transformer oscillator driven isolators in many modern process monitor/control environments.

The use of current loops enables the most popular, safe and easy method of transmitting a process variable to a distance, limited only by the electromotive force (EMF) that drives the loop. The simple two-wire connection of the current loop allows for fast and simple interconnection to as many devices in the loop (in series) as desired, limited only by the EMF of the loop.

Traditional current loop isolators are externally powered through AC mains, current loops or direct current voltage. Such traditional isolators are expensive, complex and bulky. In addition, the conventional isolators use galvanic isolation (transformers) that, due to their nature, have limited voltage breakdown and generate noise due to the oscillator technology used, which introduces errors to equipment in the input loop.

It is desirable to provide a current loop isolator which overcomes the disadvantages of the isolation devices mentioned above, and which eliminates the inherent chopper/switching electrical noise generated by existing galvanically (transformer) isolated technologies.

BRIEF DESCRIPTION OF THE DRAWINGS

The sole FIGURE of the drawing is a schematic diagram of an embodiment current loop isolator according to the present invention.

DETAILED DESCRIPTION

Reference now should be made to the circuit diagram illustrated in the sole FIGURE of the drawing. A current loop isolator circuit 10 of an embodiment of the invention is disclosed. The +L current is applied to a first input terminal 12. Two light-emitting diodes 14 and 15 are connected in series with a resistor 16 to develop the voltage to power the loop circuitry and to provide a visual display indicative of current flow in the loop. The diodes 14 and 15 also operate as a voltage regulator to protect the circuitry from over-voltages, which may result from inadvertent connections.

The resistor 16 in series with the diodes 14 and 15 passes the current through the circuitry and to the −L current loop in terminal 24 from the instant current is applied to the terminals 12 and 24. The voltage developed across the light-emitting diodes 14 and 15 and the resistor 16 is used to power a voltage to frequency converter 20 and an optical isolator circuit 22. The voltage to frequency converter circuit U1 is a National Semiconductor LM331M or its equivalent. The variable voltage across the resistor 16 is fed into the comparator input of the voltage to frequency converter circuit 20 through a resistor 26 at the junction of that resistor with a capacitor 27 connected to ground. This comparator input voltage is internally compared to the oscillator reference of the circuit 20 to determine the output frequency at the FOUT lead 28.

The selection of the design and parameters of the components comprising the voltage to frequency converter circuit 20 is made to ensure linear current to voltage to frequency conversion and operation at input current loop variations from under 4 mA to over 20 mA to cover under and over range conditions. A resistor 30 and capacitor 32 establish the R/C time constant for the circuit oscillating range, as determined by a threshold set by a resistor 34 and a capacitor 36 connected in parallel with one another and in series with a resistor 38.

A resistor 40 sets the reference for the current input to the circuit 20. The resulting frequency output of the voltage to frequency circuit 20 at output 28 turns on the internal LED of an optical isolator circuit 22, which is powered by VCC through the resistor 42. As the internal LED of the isolator 22 turns on and off, the mating opto-transistor of the isolator 22, driving a coupler capacitor 46, through a resistor 47 sharpens the pulses from the circuit 22, which triggers a frequency to a voltage converter circuit 48. The frequency to voltage converter circuit 48 also may be a National Semiconductor LM331M or its equivalent.

As noted above, the circuits 20 and 48 both are the same parts; but they are connected differently for voltage to frequency conversion for the circuit 20 and frequency to voltage for the circuit 48. The current output of the circuit 48 at its output lead 50 is directly proportional to the frequency input at the input (threshold) pin 52, as determined by the value of a resistor 51 and capacitor 53, along with a resistor 58 connected between the lead 50 in parallel with a capacitor 57 and ground. The output 50 of the circuit 48 is a pulse width modulation (PWM) current output, which is converted to voltage by the capacitor 57 and resistor 58. This is buffered by an operational amplifier 60.

The output of the amplifier 60 is converted back to current through a resistor 61 and a potentiometer 68 to be summed with current produced by the resistor 67 and a potentiometer 66. These two currents are fed into the input pin 62 of a voltage-to-current converter circuit 64. The circuit 64 may be a Texas Instrument XTR116 or its equivalent. The circuit 64 applies the two input currents supplied to its input 62 for subsequent conversion to 4-20 mA output. The potentiometer 66 sets the zero offset of the voltage-to-current converter 64 (typically 4 mA) when the input current loop is 4 mA (or as required by the process). The potentiometer 68 adjusts the output of the voltage-to-current converter 64 for 20 mA (SPAN) when the input to the voltage-to-frequency converter 20 is 20 mA (or as required by the process).

An LED 69 coupled to the +L input 70 and to the V+ terminal of the circuit 64 serves two purposes: one of these purposes is to provide a visual indication of the output power "on" and the other is to prevent reverse polarity of applied power. A transistor 72 buffers the output of the voltage-to-current converter 64 to minimize self-heating effects.

Finally, a resistor 74 connected across the output terminals 76 and 78 converts (if required) the current into a voltage output at the terminals 76 and 78.

Additionally, and as a byproduct of the circuit shown in the drawing, the circuit can be used to convert loop powered signals to a frequency output by using jumpers between terminals 80 and 82. This then would delete the circuit 48,64,60 and the associated components providing an "open collector" output of the frequency. For voltage input signals, the resistors 84 and 16 form a voltage divider to operate the voltage to frequency circuit 20, as described previously, and obtain an isolated voltage, frequency or current loop output, as explained above. For frequency input applications, jumpers between terminals 86 and 88 are used to drive the optoisolator 22 directly and are outputting either frequency, voltage, or current loop outputs, as previously explained.

The system, through the use of a voltage-to-frequency solid state converter and the other circuit components shown between the input terminals 12 and 24 and the output terminals 76 and 78, provides an effective isolator driven by the EMF in the loop without requiring any additional internal or external power source to re-transmit the loop signal. This is done in an optically isolated electronic manner without the use of any galvanic transformers. The circuit 10 is capable of an extended isolation range greater than that of galvanic systems used in the past.

The foregoing description of an embodiment of the invention is to be considered as illustrative only and not as limiting. Various changes and modifications will occur to those skilled in the art to achieve substantially the same result, in substantially the same way without departing from the true scope of the invention as defined in the appended claims.

What is claimed is:

1. A system for isolating the input and output of a self-powered current loop including: input terminals for receiving an input loop current; output terminals for supplying an output loop signal; a voltage to frequency converter coupled to the input terminals for supplying a frequency output proportional to the input current applied to the input terminals; an optical isolator coupled to the output of the voltage to frequency converter for supplying an isolated frequency output therefrom; an output circuit having an input coupled to the output of the optical isolator and providing a signal on an output thereof coupled with the output terminals; and, a potentiometer coupled to the frequency to voltage converter for adjusting an offset between the input loops current applied to the input terminals and the signal obtained from the output terminals, and further including a coupling amplifier and a voltage to current converter connected in series with one another between the output of the frequency to voltage converter and the output terminals.

2. A system according to claim 1 further including a voltage regulator between the input terminals and the voltage to frequency converter.

3. A system according to claim 1 wherein the output circuit coupled to the output of the optical isolator is a frequency-to-voltage converter.

4. A system for isolating the input and output of a self-powered current loop including: input terminals for receiving an input current; output terminals for supplying an output loop signal; a voltage to frequency converter coupled to the input terminals for supplying a frequency output proportional to the input loop current applied to the input terminals; a voltage regulator including at least one forward conducting LED diode between the input terminals and the voltage to frequency converter; an optical isolator coupled to the output of the voltage to frequency converter for supplying an isolated frequency output therefrom; a circuit having an input coupled to the output of the optical isolator and providing a signal on an output thereof coupled with the output terminals; and, a coupling amplifier and a voltage to current converter connected in series with one another between the output of the frequency to voltage converter and the output terminals; and, wherein the circuit coupled to the output of the optical isolator is a frequency-to-voltage converter.

5. A system for isolating the input and output of a self-powered current loop including: input terminals for receiving an input current; output terminals for supplying an output loop signal; a voltage to frequency converter coupled to the input terminals for supplying a frequency output proportional to the input current applied to the input terminals; an optical isolator coupled to the output of the voltage to frequency converter for supplying an isolated frequency output therefrom; a frequency to voltage converter having an input coupled to the output of the optical isolator and providing a signal on an output thereof; and a coupling amplifier and a voltage to current converter connected in series with on another between the output of the frequency to voltage converter and the output terminals; and, a potentiometer coupled to the frequency to voltage converter for adjusting an offset between the input current applied to the input terminals and the signal obtained from the output terminals.

\* \* \* \* \*